United States Patent
Peraelae et al.

(10) Patent No.: US 10,663,837 B2
(45) Date of Patent: May 26, 2020

(54) METHOD FOR OPERATING A LIGHT SOURCE FOR A CAMERA, LIGHT SOURCE, CAMERA

(71) Applicant: OSRAM OLED GmbH, Regensburg (DE)

(72) Inventors: Mikko Peraelae, Tegernheim (DE); Desiree Queren, Neutraubling (DE); Marco Antretter, Parkstetten (DE)

(73) Assignee: OSRAM OLED GmbH, Regensburg (DE)

( * ) Notice: Subject to any disclaimer, the term of this patent is extended or adjusted under 35 U.S.C. 154(b) by 0 days.

(21) Appl. No.: 15/902,864

(22) Filed: Feb. 22, 2018

(65) Prior Publication Data

US 2018/0239220 A1 Aug. 23, 2018

(30) Foreign Application Priority Data

Feb. 22, 2017 (DE) .................. 10 2017 103 660

(51) Int. Cl.
  *G03B 15/05* (2006.01)
  *H04N 5/235* (2006.01)
  (Continued)

(52) U.S. Cl.
  CPC .............. *G03B 15/05* (2013.01); *G01C 3/08* (2013.01); *G01S 17/08* (2013.01); *G01S 17/88* (2013.01);
  (Continued)

(58) Field of Classification Search
  CPC ........ G03B 15/05; H04N 13/254; G01C 3/08; G01S 17/08
  See application file for complete search history.

(56) References Cited

U.S. PATENT DOCUMENTS

| 6,091,905 A | 7/2000 | Yahav et al. |
| 6,654,556 B2 | 11/2003 | Braun et al. |

(Continued)

FOREIGN PATENT DOCUMENTS

| CN | 101116315 A | 1/2008 |
| CN | 103314321 A | 9/2013 |

(Continued)

*Primary Examiner* — Clayton E. LaBalle
*Assistant Examiner* — Linda B Smith
(74) *Attorney, Agent, or Firm* — Slater Matsil, LLP (57) ABSTRACT

In an embodiment a method includes illuminating a scene in a first illumination by identically driving the emitters of a light source such that first exposures and/or first colour values of segments are ascertained by an image sensor, determining first illumination parameters for the segments of the scene, wherein the first illumination parameters are determined based on the first exposures and/or the first colour values, illuminating the scene in a second subsequent illumination by differently driving the emitters based on the first illumination parameters of the segments such that second exposures and/or second colour values of the segments are ascertained by the image sensor, determining second illumination parameters for the segments of the scene, wherein the second illumination parameters are determined based on the second exposures and/or the second colour values and illuminating the scene in a third subsequent illumination by differently driving the emitters based on the second illumination parameters of the segments.

18 Claims, 8 Drawing Sheets

(51) Int. Cl.
*G01S 17/88* (2006.01)
*H04N 13/254* (2018.01)
*H04N 13/25* (2018.01)
*G01C 3/08* (2006.01)
*G01S 17/42* (2006.01)
*H04N 9/04* (2006.01)
*G03B 15/03* (2006.01)
*G01S 17/08* (2006.01)
*G01S 17/10* (2020.01)

(52) U.S. Cl.
CPC ........... *G03B 15/03* (2013.01); *H04N 5/2354* (2013.01); *H04N 9/045* (2013.01); *H04N 13/254* (2018.05); *G01S 17/10* (2013.01); *G01S 17/42* (2013.01); *H04N 13/25* (2018.05)

(56) References Cited

U.S. PATENT DOCUMENTS

| | | | |
|---|---|---|---|
| 7,355,648 B1 | 4/2008 | Braun et al. | |
| 7,920,205 B2* | 4/2011 | Awazu | G03B 15/02 348/371 |
| 9,338,849 B2* | 5/2016 | Logiudice | H05B 33/0845 |
| 2004/0125220 A1* | 7/2004 | Fukuda | H04N 5/23216 348/234 |
| 2007/0019129 A1* | 1/2007 | Negley | G02F 1/133603 349/61 |
| 2007/0035628 A1* | 2/2007 | Kanai | H04N 5/2259 348/159 |
| 2009/0008530 A1 | 1/2009 | Wernersson | |
| 2010/0200752 A1* | 8/2010 | Lee | H04N 5/2254 250/330 |
| 2012/0275688 A1* | 11/2012 | Stainlay | G06T 7/55 382/154 |
| 2012/0294599 A1* | 11/2012 | Lu | G03B 15/05 396/164 |
| 2013/0293768 A1* | 11/2013 | Niyagawa | G02B 7/32 348/346 |
| 2014/0267701 A1 | 9/2014 | Aviv et al. | |
| 2014/0340572 A1 | 11/2014 | Sato et al. | |
| 2016/0112621 A1* | 4/2016 | Nishi | H04N 5/2354 348/234 |
| 2016/0112622 A1* | 4/2016 | Gressum | G03B 15/02 348/370 |
| 2017/0353710 A1* | 12/2017 | Sasaki | H04N 13/25 |

FOREIGN PATENT DOCUMENTS

| | | |
|---|---|---|
| CN | 103969920 A | 8/2014 |
| CN | 104050656 A | 9/2014 |
| DE | 4124794 A1 | 1/1993 |
| DE | 102005021808 A1 | 11/2006 |
| DE | 102014101354 A1 | 8/2014 |
| DE | 102016104381 A1 | 9/2017 |
| TW | 201249190 A | 12/2012 |
| WO | 2016082112 A1 | 6/2016 |

* cited by examiner

METHOD FOR OPERATING A LIGHT SOURCE FOR A CAMERA, LIGHT SOURCE, CAMERA

CROSS-REFERENCE TO RELATED APPLICATIONS

This application claims the benefit of German patent application 10 2017 103 660.1, filed on Feb. 22, 2017, which application is hereby incorporated herein by reference.

TECHNICAL FIELD

The invention relates to a method for operating a light source for a camera, and to a camera.

BACKGROUND

Static and/or moving images may be recorded by means of a camera, wherein in particular recordings of a scene may be created thereby. In order to sufficiently illuminate the scene, a light source may be used. In this case, the type of light source predefines a light colour and/or a brightness for the scene.

SUMMARY

Embodiments of the invention provide an improved method for operating a light source for a camera, and an improved camera.

In various embodiments, a method for operating a light source for a camera during the recording of a scene is disclosed. The camera may comprise at least two individually driveable emitters, wherein the emitters individually illuminate segments of the scene. The method may include an illumination parameter is determined for a segment of the scene and an emitter is individually driven on the basis of the illumination parameter. In this case, the illumination parameter is determined by a measurement of a physical variable and/or by an input of a user.

By virtue of the individual driving of the emitter that illuminates the segment of the scene, the illumination of the scene during the recording may be individually adapted on the basis of the illumination parameter.

In one embodiment, the illumination parameter is a light intensity and/or a colour temperature. In this case, provision may be made for illuminating different segments of the scene with a different light intensity and/or a different colour temperature.

In one embodiment, the individually driveable emitters are constructed from at least two single emitters. The single emitters are likewise individually driveable. A colour temperature of an emitter as illumination parameter may be set by the individual driving of the single emitters.

In one embodiment, the physical variable is an exposure and/or a colour value. The exposure and/or the colour value are/is thus measured and the emitters are subsequently driven on the basis of the measured colour value and/or the measured illumination. As a result, the exposure and/or the colour value may be used to set the light intensity and/or the colour temperature of the light source and thus to adapt the exposure and/or the colour value of at least one segment of the scene.

In one embodiment, the measurement of the physical variable is carried out by the scene firstly being illuminated in a first illumination by means of the light source in such a way that the emitters are driven identically. By means of an image sensor the exposure and/or the colour value of at least one segment of the scene are/is ascertained. The illumination parameters are subsequently determined on the basis of the ascertained exposure and/or the ascertained colour value. Afterwards, the scene is illuminated in a second illumination by means of the light source, wherein in this case the emitters are operated individually differently on the basis of the illumination parameter of the at least one segment, while the recording is created by means of the image sensor during the second illumination.

As a result, firstly the scene may be illuminated, at least one illumination parameter of a segment may be determined on the basis of the illumination and the light source may subsequently be operated for the following recording on the basis of the illumination parameter. This is advantageous particularly when the light source is used as a camera flash.

As a result, firstly during the first exposure the scene may be illuminated uniformly and the fact of whether different segments of the scene should be illuminated differently may be ascertained on the basis of said first exposure. During the second exposure the emitters may then be operated differently in such a way that the segments are illuminated differently on the basis of the illumination parameters ascertained by the first exposure.

In one embodiment, during the first illumination the emitter is operated with a lower intensity than in the case of the second illumination. As a result, by way of example, in the case of light-sensitive objects within the scene it is possible to minimize the light power radiated in overall.

In one embodiment, a further illumination is carried out between the first illumination and the second illumination. The light intensity of the further illumination corresponds to the light intensity of the first illumination. The emitters are operated individually differently on the basis of the illumination parameter of the segment in the case of the further illumination. During the further illumination the exposure and/or the colour value of the segments are/is ascertained. These exposures and/or colour values ascertained during the further illumination are taken into account when ascertaining the illumination parameters for the second exposure.

As a result, firstly during the first exposure the scene may be illuminated uniformly and the fact of whether different segments of the scene should be illuminated differently may be ascertained on the basis of said first exposure. During the further exposure the emitters may then be operated differently in such a way that the segments are illuminated differently on the basis of the illumination parameters ascertained by the first exposure. As a result, the illumination parameters ascertained may be checked and, if appropriate, adapted for the second exposure. In the case of the second exposure, the emitters are then operated on the basis of these adapted illumination parameters.

In one embodiment, the physical variable comprises the distance from an object in a segment of the scene to the camera, wherein the illumination parameter is determined on the basis of said distance. As a result, objects, depending on their distance to the camera, may be illuminated with an individual exposure and/or an individual colour value during the recording of the camera. By way of example, a background of the scene may be illuminated differently from an object in a foreground of the scene.

In one embodiment, the distance between camera and object is ascertained by means of a stereoscopic evaluation of two image sensors. A stereoscopic evaluation of two image sensors enables the distance from the object to the camera to be ascertained in a simple manner.

In one embodiment, the distance from the camera to the object is ascertained by means of the evaluation of a radiation pulse. This likewise enables the distance between camera and object to be ascertained in a simple manner.

In one embodiment, the radiation pulse is emitted by a radiation source and reflected from an object partly in the direction of the camera. The reflected radiation is detected by a spatially resolving radiation detector. The detected radiation comprises different propagation times depending on the segment of the scene and the distance from the object to the camera. The distance from the object to the camera is determined on the basis of the propagation times.

In one embodiment, the distance from the camera is determined by means of LIDAR. In this case, LIDAR stands for "light detection and ranging", that is to say ascertaining a distance by means of light.

In one embodiment, the scene is illuminated with structured light comprising a predefined pattern. The predefined pattern is distorted by objects in segments of the scene. A distance from the objects to the camera may be ascertained by an evaluation of the distortion of the light on account of the objects.

In one embodiment, a preview image is displayed on a screen of the camera, wherein a user may manually select a region of the preview image and define an illumination parameter, in particular a light intensity and/or a colour temperature, for the manually selected region.

A light source is configured to be used in one of the methods mentioned.

A camera comprises a light source, a control device and an image sensor, wherein the control device is configured to control the light source and, if appropriate, to evaluate the image sensor and in this case to carry out one of the methods.

A mobile telephone and a tablet PC, respectively, comprise such a camera.

BRIEF DESCRIPTION OF THE DRAWINGS

The above-described properties, features and advantages of this invention and the way in which they are achieved will become clearer and more clearly understood in association with the following description of the exemplary embodiments which are explained in greater detail in association with the drawings, in which, in each case in a schematic illustration.

DETAILED DESCRIPTION OF ILLUSTRATIVE EMBODIMENTS

Figure 1:
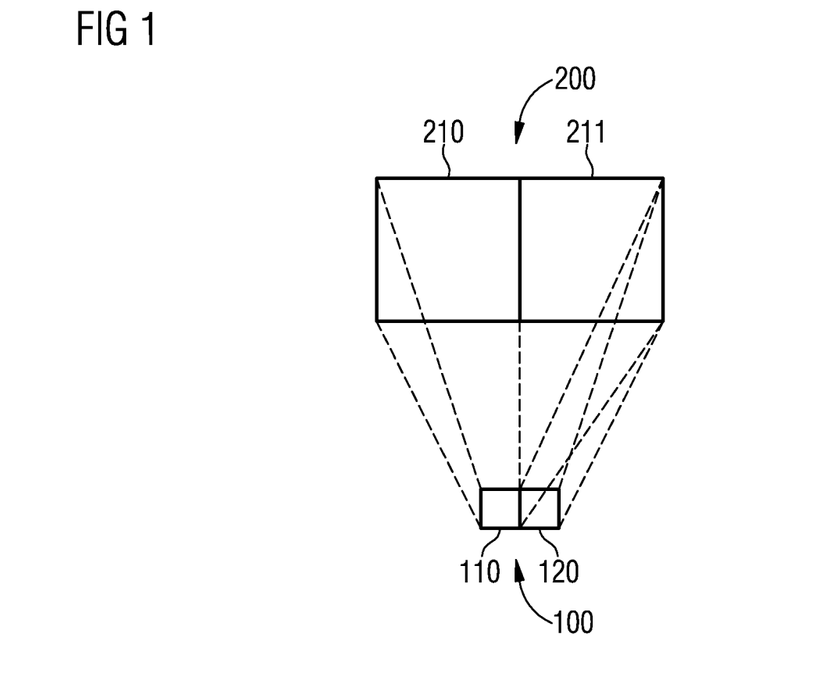
FIG. 1 shows a light source that illuminates a scene.

FIG. 1 shows a light source 100, comprising two individually driveable emitters 110, 120. A scene 200 is illuminated by means of the light source 100. In this case, the scene 200 comprises a first segment 210 and a second segment 211. A first emitter 110 is configured to illuminate the entire scene 200 consisting of a first segment 210 and a second segment 211. The second emitter 120 is configured to illuminate the second segment 211 of the scene 200. If the scene 200 is intended to be recorded by a camera, an illumination parameter is determined for the second segment 211 of the scene 200. The second emitter 120 is then driven independently of the first emitter 110 on the basis of the illumination parameter. In this case, the illumination parameter for the second segment of the scene may be implemented by a measurement of a physical variable and/or by an input of a user.

In one exemplary embodiment, the first emitter 110 is configured to illuminate only the first segment 210 of the scene 200. In this case, the first emitter 110 may be driven on the basis of an illumination parameter for the first segment 210, while the second emitter 120 is driven on the basis of an illumination parameter for the second segment 211.

In one exemplary embodiment, the illumination parameter is a light intensity and/or a colour temperature. Provision may thus be made for illuminating the first segment 110 with a different intensity from the second segment 120. Likewise, provision may be made for illuminating the first segment 110 with a different colour temperature from the second segment 120.

Figure 2:
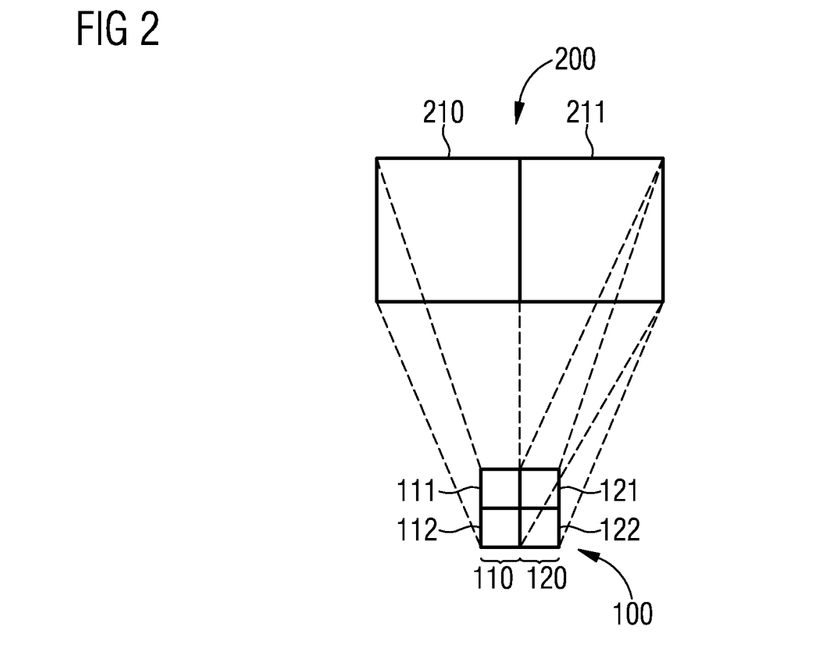
FIG. 2 shows a further light source during the illumination of a scene.

FIG. 2 likewise shows a light source 100, comprising two individually driveable emitters 110, 120. A scene 200 is once again illuminated by means of the light source 100. In this case, the scene 200 comprises a first segment 210 and a second segment 211. A first emitter 110 is configured to illuminate the entire scene 200 consisting of a first segment 210 and a second segment 211. The second emitter 120 is configured to illuminate the second segment 211 of the scene 200.

The first emitter 110 is constructed from a first single emitter 111 and a second single emitter 112. The second emitter 120 is constructed from a third single emitter 121 and a fourth single emitter 122. The single emitters 111, 112, 121, 122 are each individually driveable. The first single emitter 111 and the second single emitter 112 comprise a mutually different colour temperature. The third single emitter 121 and the fourth single emitter 122 likewise comprise a mutually different colour temperature. A colour temperature of the first emitter 110 may be set by an individual driving of the first single emitter 111 and the second single emitter 112. Likewise, a colour temperature of the second emitter 120 may be set by an individual driving of the third single emitter 121 and the fourth single emitter 122. As a result, the light source may be operated in such a way that the first segment 210 and the second segment 211 of the scene 200 are illuminated with a different colour temperature.

Here, too, provision may be made for the first emitter 110 to illuminate exclusively the first segment 210 of the scene 200.

Figure 3:
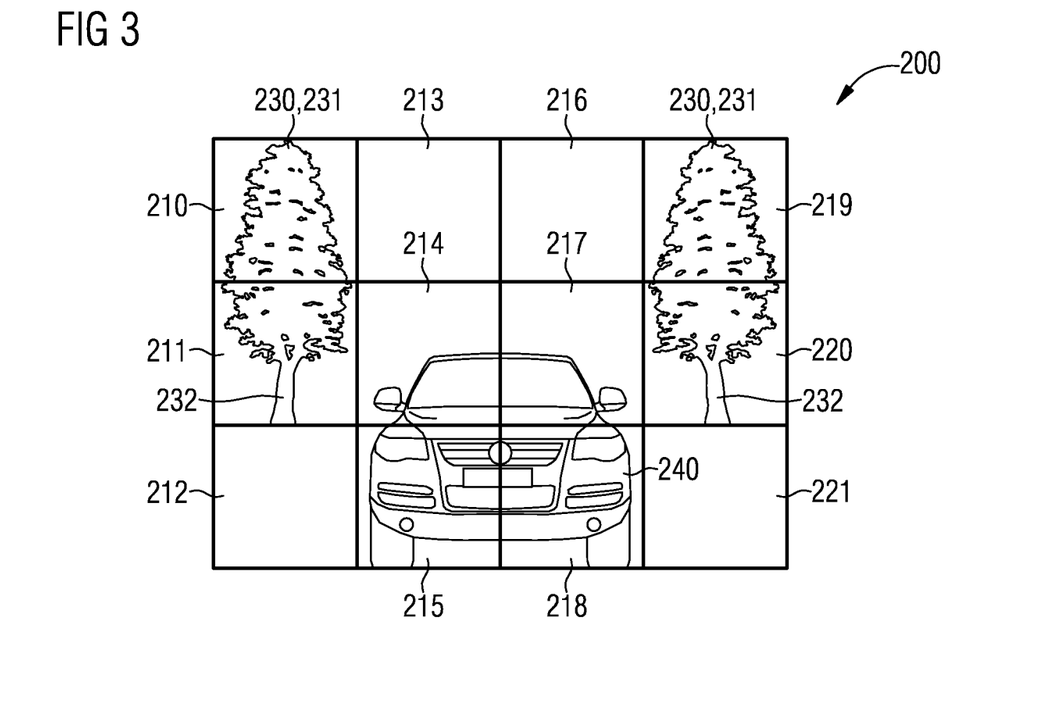
FIG. 3 shows a scene.

FIG. 3 shows a scene 200 subdivided into twelve segments 210, 211, 212, 213, 214, 215, 216, 217, 218, 219, 220, 221. A tree 230 is situated in a first segment 210 and in a second segment 211 of the scene 200. A tree 230 is likewise situated in a tenth segment 219 and in an eleventh segment 220 of the scene 200. A vehicle 240 is situated in a fifth segment 214, a sixth segment 215, an eighth segment 217 and a ninth segment 218. No objects are situated in a third segment 212, a fourth segment 213, a seventh segment 216 and a twelfth segment 221 of the scene 200.

Figure 4:
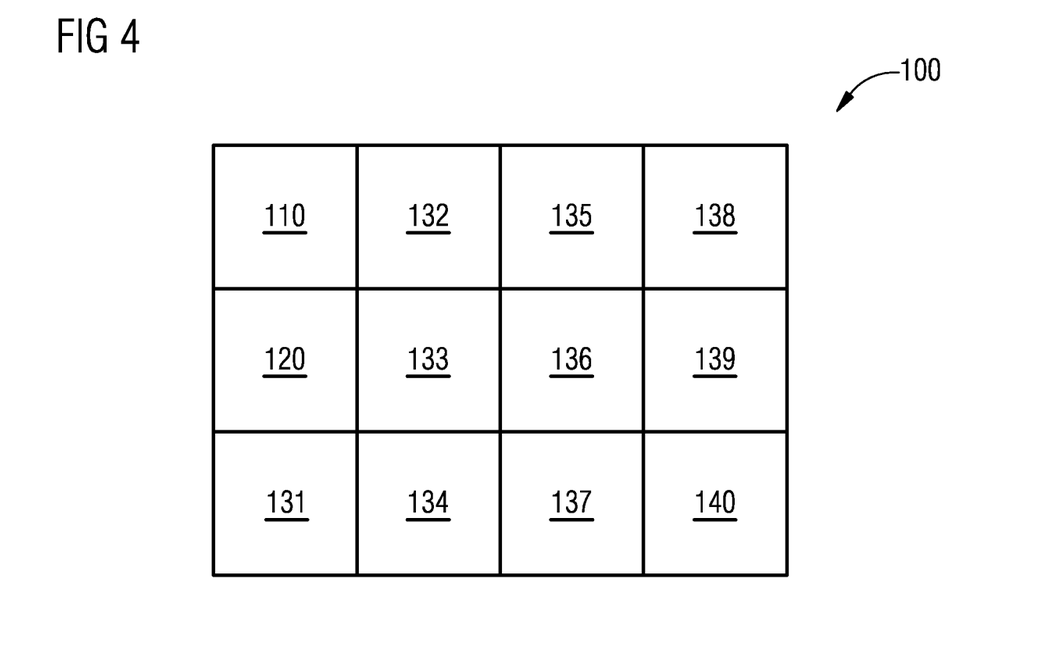
FIG. 4 shows a light source for illuminating a scene.

FIG. 4 shows a light source 100 for illuminating the scene 200 from FIG. 3. The light source 100 is subdivided into twelve emitters 110, 120, 131, 132, 133, 134, 135, 136, 137, 138, 139, 140, wherein the emitters 110, 120, 131, 132, 133, 134, 135, 136, 137, 138, 139, 140 individually illuminate in each case one of the twelve segments 210, 211, 212, 213, 214, 215, 216, 217, 218, 219, 220, 221. A first emitter 110 illuminates the first segment 210. A second emitter 120 illuminates the second segment 211. A third emitter 131 illuminates the third segment 212. A fourth emitter 132 illuminates the fourth segment 213. A fifth emitter 133 illuminates the fifth segment 214. A sixth emitter 134 illuminates the sixth segment 215. A seventh emitter 135 illuminates the seventh segment 216. An eighth emitter 136 illuminates the eighth segment 217. A ninth emitter 137 illuminates the ninth segment 218. A tenth emitter 138 illuminates the tenth segment 219. An eleventh emitter 139 illuminates the eleventh segment 220. A twelfth emitter 140 illuminates the twelfth segment 221.

The emitters 110, 120, 131, 132, 133, 134, 135, 136, 137, 138, 139, 140 may each once again be constructed from single emitters analogously to FIG. 2.

If a recording of the scene 200 is then intended to be created, provision may be made for an illumination parameter for the fifth segment 214, the sixth segment 215, the eighth segment 217 and the ninth segment 218, in which the vehicle 240 is situated, to be intended to be chosen differently from any other segments. By way of example, provision may be made for the vehicle 240 to be illuminated more intensely than the rest of the recording. The fifth emitter 133, the sixth emitter 134, the eighth emitter 136 and the ninth emitter 137 are then operated with a greater intensity than the remaining emitters 110, 120, 131, 132, 135, 138, 139, 140.

The tree 230 in the first segment 210 and the second segment 212 of the scene comprises a treetop 231 in the first segment 211 and a trunk 232 in the second segment 211. Provision may be made for the tree 230 to be intended to be illuminated with a different colour temperature compared with the vehicle 240. The first emitter 110 and the second emitter 120 may then be operated with a different colour temperature from that of the fifth emitter 133, the sixth emitter 134, the eighth emitter 136 and the ninth emitter 137, which illuminate the vehicle 240. Likewise, provision may be made for treetop 231 and trunk 232 to be illuminated with a mutually different colour temperature. In this case, the first emitter 110 may be operated with a different colour temperature from the second emitter 120.

In one exemplary embodiment, the scene 200 from FIG. 3 is illuminated in a first exposure by means of the light source 100 from FIG. 4 in such a way that the emitters 110, 120, 131, 132, 133, 134, 135, 136, 137, 138, 139, 140 are driven identically in order thus to uniformly illuminate the scene 200. The exposure and/or the colour value of the segments 210, 211, 212, 213, 214, 215, 216, 217, 218, 219, 220, 221 of the scene 200 are/is determined by means of an image sensor, which may be the image sensor of the camera. An illumination parameter for the segments 210, 211, 212, 213, 214, 215, 216, 217, 218, 219, 220, 221 of the scene 200 is respectively ascertained on the basis of the exposure and/or the colour value of the segments 210, 211, 212, 213, 214, 215, 216, 217, 218, 219, 220, 221 of the scene 200. The scene 200 is subsequently illuminated in a second exposure by the light source 100 in such a way that the emitters 110, 120, 131, 132, 133, 134, 135, 136, 137, 138, 139, 140 are operated in each case on the basis of the illumination parameter for the segments 210, 211, 212, 213, 214, 215, 216, 217, 218, 219, 220, 221 of the scene 200.

In one exemplary embodiment, during the first exposure the light source 100 is operated with a lower intensity than during the second exposure.

In one exemplary embodiment, a further exposure is carried out between the first exposure and the second exposure, in the case of which further exposure the light source 100 is operated with the intensity of the first exposure, but the emitters 110, 120, 131, 132, 133, 134, 135, 136, 137, 138, 139, 140 are already operated on the basis of the illumination parameter for the segments 210, 211, 212, 213, 214, 215, 216, 217, 218, 219, 220, 221 of the scene 200. By virtue of the further exposure, the illumination parameters for the segments 210, 211, 212, 213, 214, 215, 216, 217, 218, 219, 220, 221 of the scene 200 are checked and, if appropriate, adapted.

Provision may be made for the scene 200 to comprise more than twelve segments 210, 211, 212, 213, 214, 215, 216, 217, 218, 219, 220, 221 and for the light source 100 to comprise more than twelve emitters 110, 120, 131, 132, 133, 134, 135, 136, 137, 138, 139, 140 operated with the intensity of the first exposure.

Figure 5:
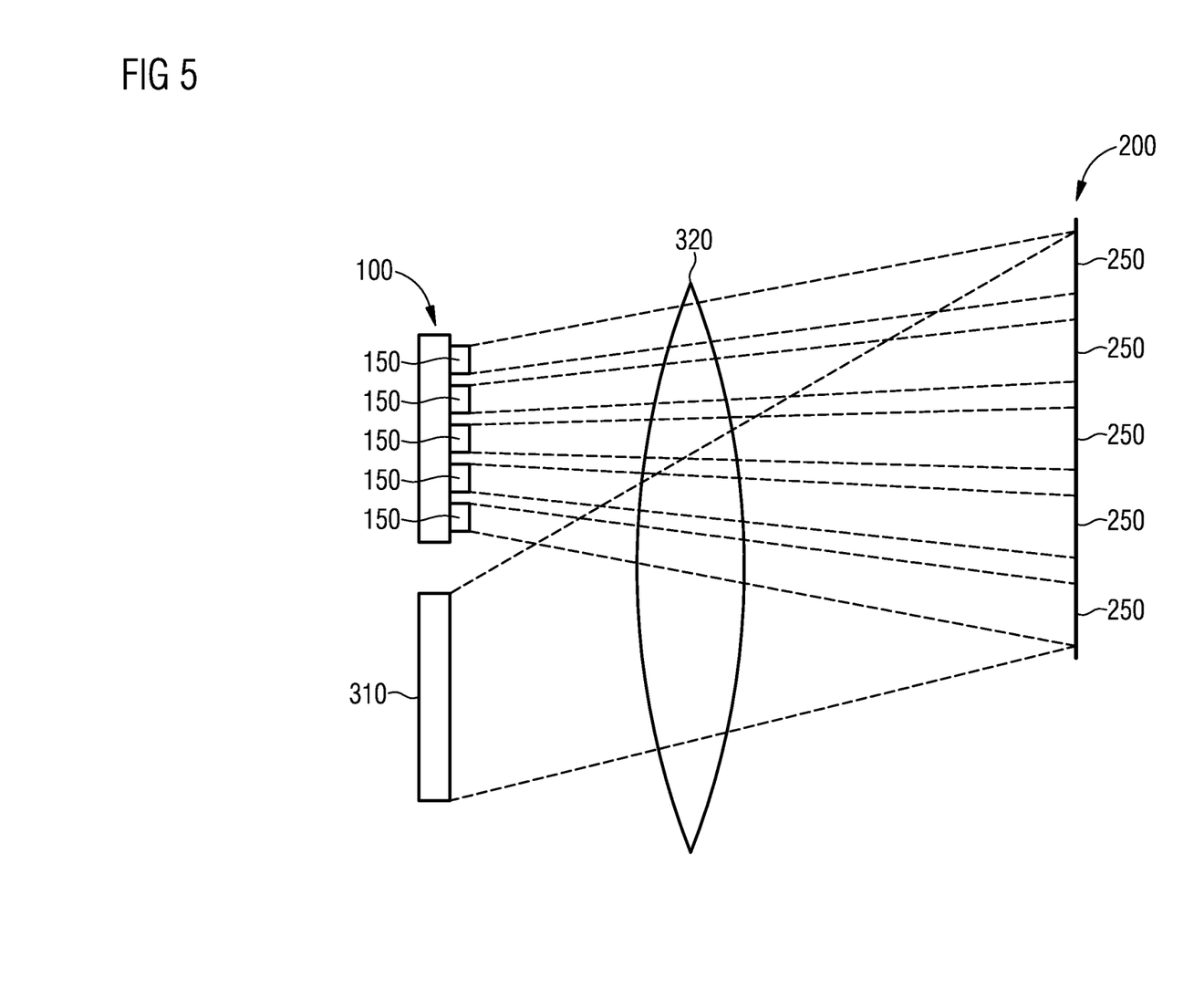
FIG. 5 shows a cross section of an optical unit for a light source and an image sensor.

FIG. 5 shows a cross section through an optical unit 320 for illuminating a scene 200. A light source 100 comprises emitters iso, wherein the emitters 150 in each case individually illuminate segments 250 of the scene. The optical unit 320 is arranged between the light source 100 and the scene 200. The optical unit 320 may be constructed, for example, like a lens of a camera. Light emerging from the scene 200 likewise passes through the optical unit 320 onto an image sensor 310. Provision may also be made of different optical units for light source 100 and image sensor 310.

The illumination parameters for the segments 250 of the scene 200 may be determined by means of the image sensor 310.

Figure 6:
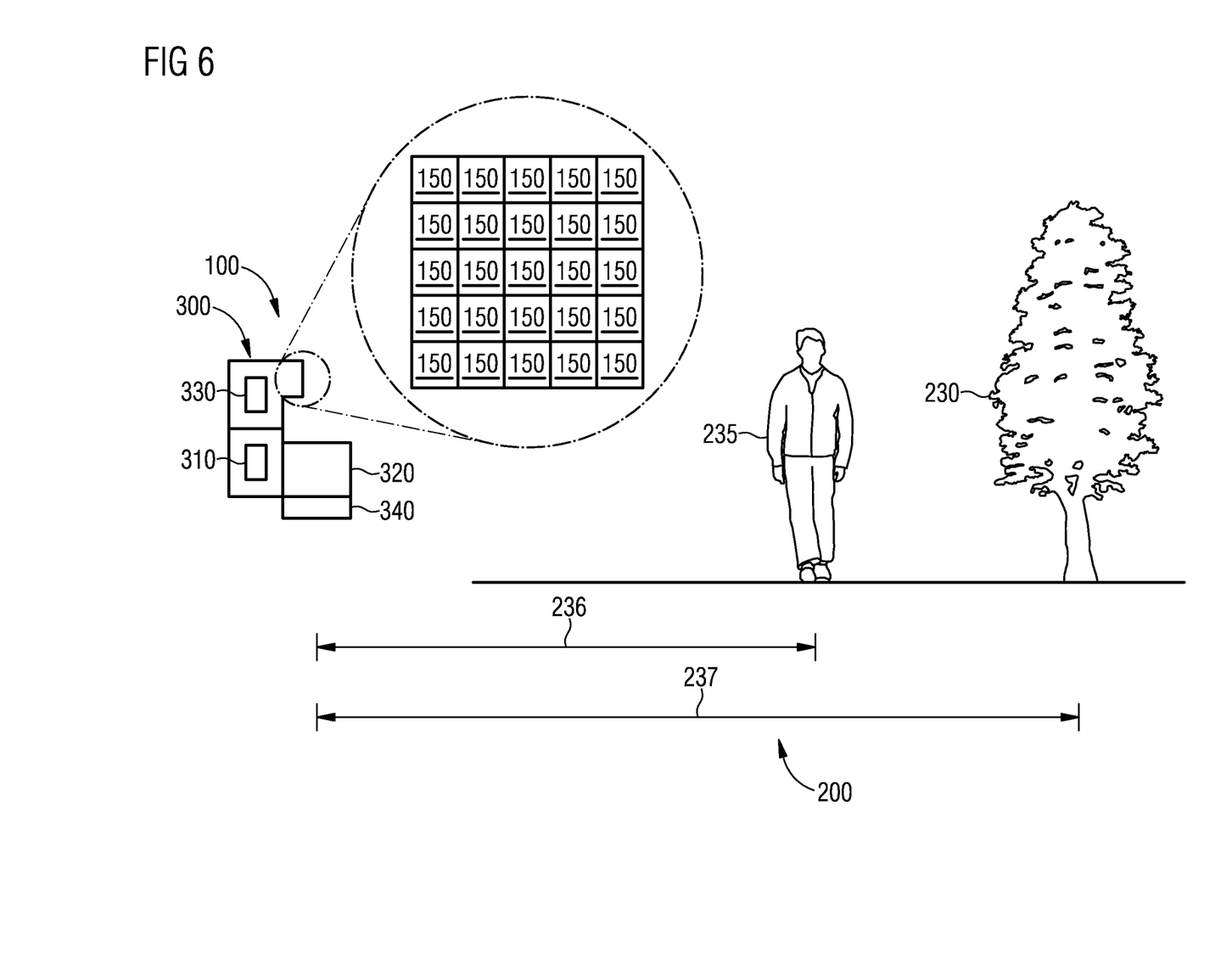
FIG. 6 shows a camera and a scene during a recording.

FIG. 6 shows a camera 300 during a recording of a scene 200. The camera 300 comprises a light source 100 constructed from twenty-five emitters iso, wherein the emitters in each case individually illuminate a segment of the scene 200. The camera furthermore comprises an image sensor 310, an optical unit 320, here embodied as a lens, a controller 330 and a device 340 for distance measurement. In the scene 200 there is a tree 230 situated in the background and a person 235 in the foreground. The person 235 is at a first distance 236 from the camera 300, while the tree is at a second distance 237 from the camera 300, said second distance being greater than the first distance 236.

The illumination parameters with which the emitters 150 are operated are determined on the basis of the first distance 236 and the second distance 237. In this case, the distances 236, 237 may be ascertained by means of the device 340 for distance measurement. Alternatively, the distances may also be ascertained by means of the image sensor 310. In this case, the device 340 for distance measurement is not necessary.

In one exemplary embodiment, the camera 300 comprises two image sensors 310. The controller 330 is configured to stereoscopically evaluate the image sensors 310 and to ascertain the distances 236, 237 on the basis of this evaluation.

In one exemplary embodiment, the distances 236, 237 are ascertained by means of a propagation time measurement of a radiation pulse. In this case, the radiation pulse may be emitted by the device 340 for distance measurement. The reflected radiation pulse is detected by the device 340 for distance measurement. This may involve a LIDAR system, for example.

Provision may likewise be made for a short radiation pulse to be emitted by the light source 100. Part of the short radiation pulse is reflected from the tree 230 and the person 235 in the direction of the camera. By means of the image sensor 310, it is possible to ascertain the propagation times of the radiation pulse depending on the location of the reflection and thus the distances 236, 237. A device 340 for distance measurement is not necessary in this case.

Figure 7:
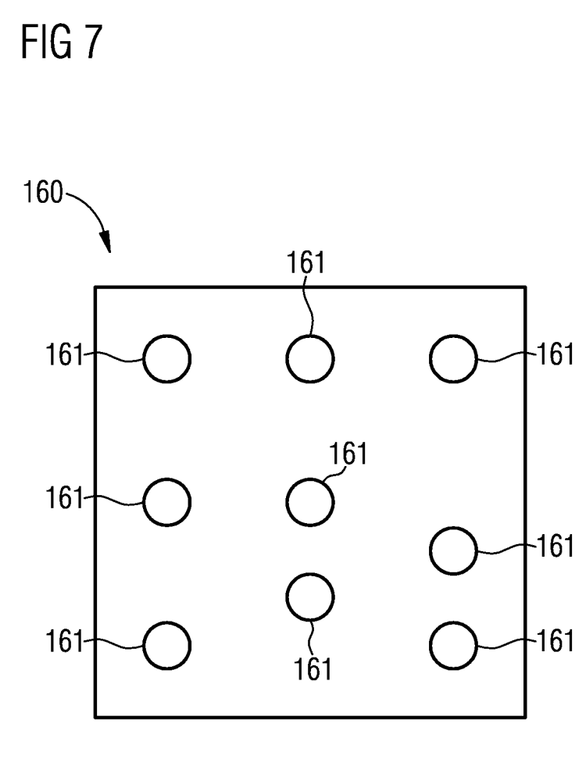
FIG. 7 shows a distortion of structured light by an object.

FIG. 7 shows structured light 160, which may be emitted, for example, by the device 340 for distance measurement from FIG. 6. The structured light 160 consists of light spots 161 comprising a predefined pattern. If the structured light 160 comprising the light spots 161 impinges on an object 260 of a scene, displaced light spots 162 may be detected. In this case, the displaced light spots are displaced in comparison with the other light spots 161. By evaluating the displaced light spots 162 and the non-displaced light spots 161, it is possible in this case to ascertain the existence and the distance of the object 260 in the scene.

The predefined pattern of the structured light 160 is thus distorted by objects 260 within the scene 200 and the distortion is evaluated.

Figure 8:
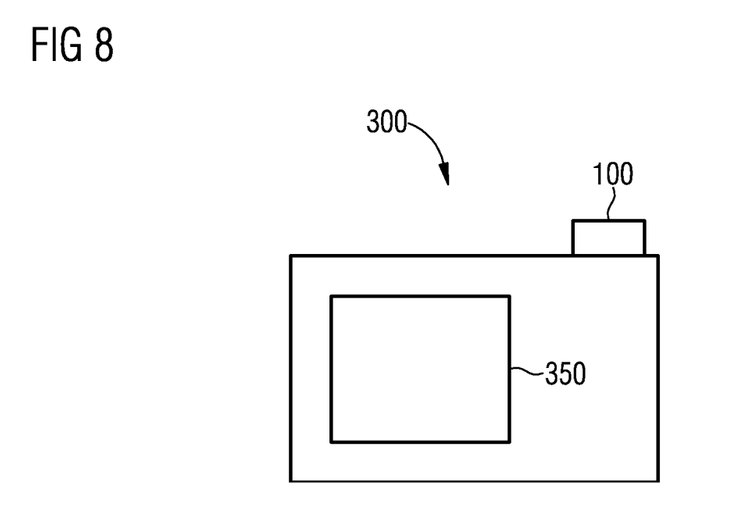
FIG. 8 shows a camera.

FIG. 8 shows a camera 300 comprising a screen 350. The camera 300 is configured to display a preview image on the screen 350. A user of the camera 300 may select a region of the preview image displayed on the screen 350 and define an illumination parameter, in particular a light intensity and/or a colour temperature, for the manually selected region. A light source 100 of the camera 300 is subsequently operated on the basis of the illumination parameter selected by the user.

Figure 9:
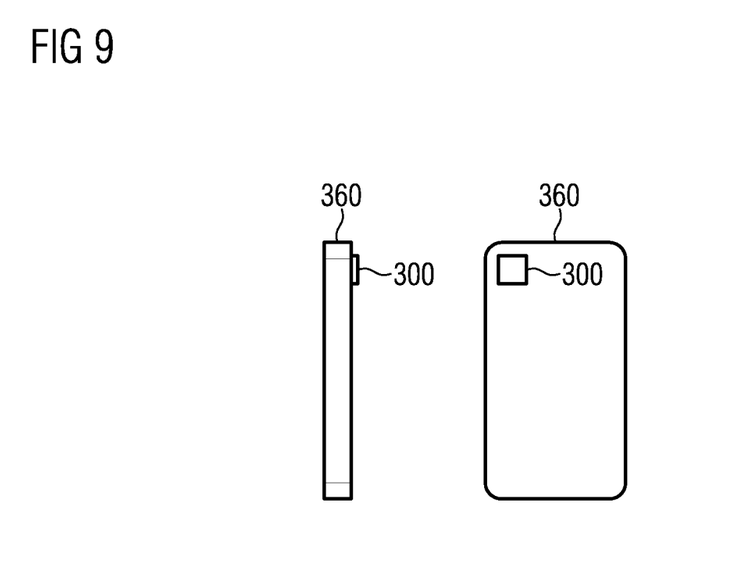
FIG. 9 shows a mobile telephone comprising a camera.
Figure 10:
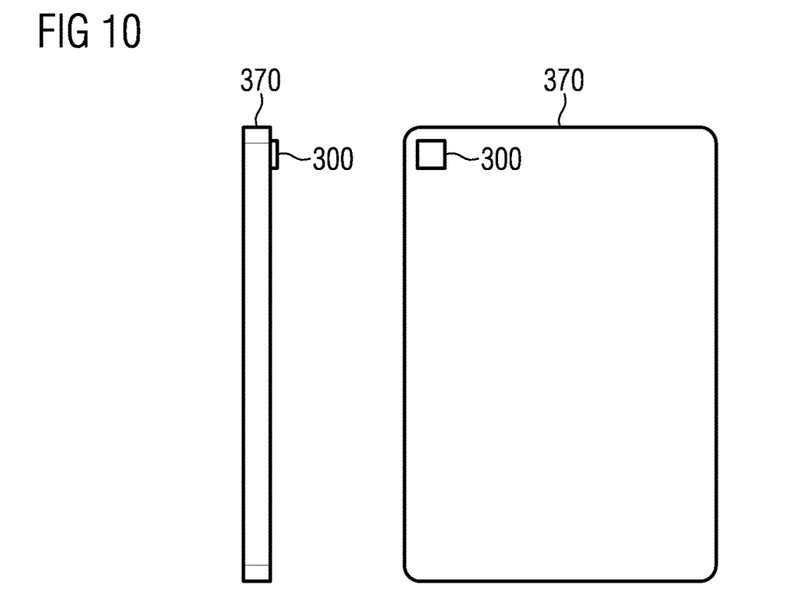
FIG. 10 shows a tablet PC comprising a camera.

FIG. 9 shows a mobile telephone 360 comprising a camera 300 configured to carry out one of the methods mentioned. FIG. 10 shows a tablet PC 370 comprising a camera 300 configured to carry out one of the methods mentioned.

Figure 11:
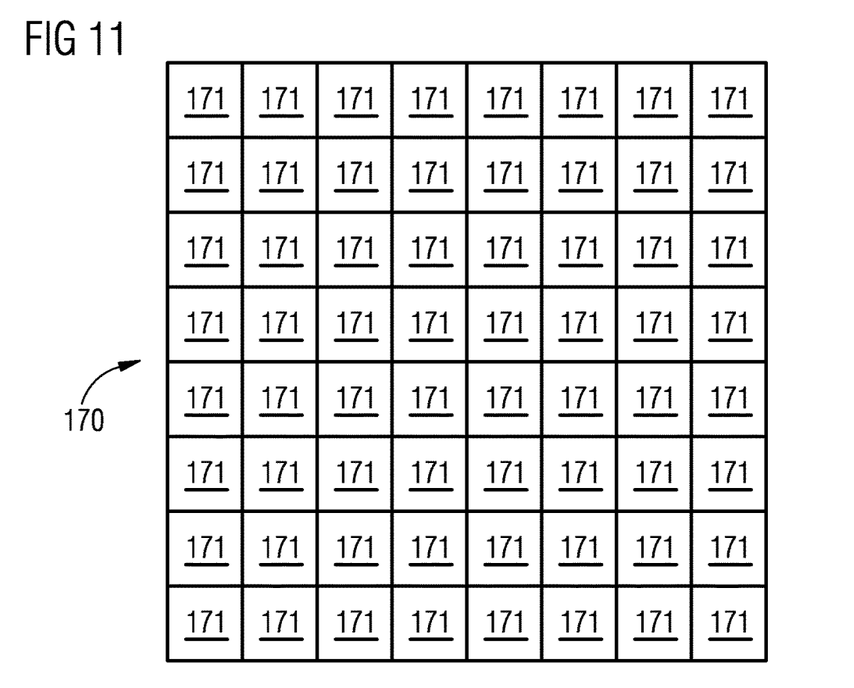
FIG. 11 shows a pixelated emitter for a light source.

FIG. 11 shows a pixelated emitter 170 that may be used as a light source 100. The pixelated emitter 170 comprises emitters 171, each of which may illuminate a segment of a scene analogously to FIGS. 1 to 3. In this case, the number of emitters 171 of the pixelated emitter 170 is less than or equal to the number of pixels of the image sensor 310 of the camera 300. An emitter may be configured, e.g., in the form of a light emitting diode or laser diode. The light emitting diodes or the laser diode may be configured as semiconductor chips.

The pixelated emitter 170 may be constructed, for example, from light emitting diodes on a carrier, wherein the light emitting diodes may in turn comprise conversion materials. In this case, the emitters 171 may be constructed in particular from two single emitters, which emit white light comprising different colour temperatures, or from three single emitters, which emit red, green and blue light, respectively.

The emitters 110, 120, 131, 132, 134, 135, 136, 137, 138, 139, 140, 150, 171 of the light source 100 may be configured, for example, in the form of a light emitting diode or a laser diode. In this case, the light emitting diodes or laser diodes may be configured as semiconductor chips and comprise a conversion material.

Figure 12:
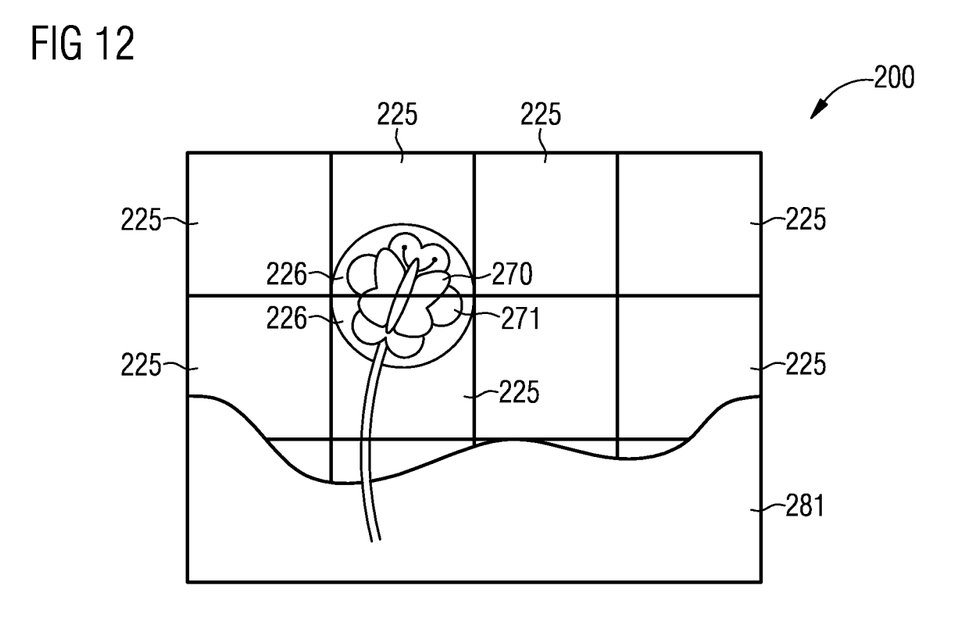
FIG. 12 shows a further scene.

FIG. 12 shows a further scene 200 that is intended to be recorded by a camera 300 comprising a light source 100. The scene comprises a butterfly 270 on a flower 271. In this case, the flower 271 is situated in the vicinity of a lake 280 at the lakeside 281. The flower 270 with the butterfly 271 is arranged in front of the lake 280. The scene is intended to be recorded contre-jour. This means that, for example, the sun illuminates the scene 200 from an opposite side relative to the camera 300. This gives rise to strongly illuminated segments 225 as a result of reflection of the sunlight on the water surface of the lake 280. The butterfly 270 is not directly illuminated by the sun, since it is situated in the shade of the flower 271 on that side of the flower which faces away from the sun. As a result, the butterfly is situated in weakly illuminated segments 226.

If the scene 200 is then illuminated using a conventional light source of a conventional camera, the strongly illuminated segments 225 of the lake 280 will be overexposed, while the weakly illuminated segments 226 will be underexposed. However, the butterfly 270 is intended to be shown to advantage in the recording, which is made more difficult by the illumination situation. By recording a plurality of images of the weakly illuminated segments 226, it is possible to create a recording with a higher exposure. However, if the camera or the butterfly 270 moves during the recording of the images, the recording will be blurred.

However, if the scene 200 from FIG. 12 is recorded using a camera 300 comprising a light source 100 constructed from a plurality of emitters 150, the scene 200 may be illuminated in a first illumination by the light source 100 in such a way that the emitters 150 uniformly illuminate the scene. This may be carried out, for example, by the emitters 150 being driven uniformly. This should also be understood to mean that during the first illumination the emitters 150 are driven in such a way that the scene 200 is illuminated only very little or is not illuminated at all by the emitters 150. The exposure of the segments 225, 226 of the scene is ascertained by means of the image sensor 310 of the camera 300.

On the basis of the exposure ascertained by the image sensor 310, said exposure representing a physical variable, the segments 225, 226 are subdivided into strongly illuminated segments 225 and weakly illuminated segments 226. The control device 330 of the camera 300 then ascertains which of the emitters 150 illuminate the weakly illuminated segments 226. During a second illumination of the scene 200, the emitters 150 which are directed at the weakly illuminated segments 226 of the scene are then operated. As a result, the exposure is significantly increased in the weakly illuminated segments 226 of the scene 200. In this case, the illumination parameter is the light intensity with which the segments 225, 226 are to be illuminated in each case. During the second illumination, the recording is created by means of the image sensor 310.

Likewise, between the first illumination and the second illumination it is possible to carry out further illuminations for the purpose of more accurately ascertaining the driving of the individual emitters 150.

Furthermore, it is also possible to provide more than two different light intensities for different segments.

Although the invention has been more specifically illustrated and described in detail by means of the preferred exemplary embodiments, the invention is not restricted by the examples disclosed and other variations may be derived therefrom by the person skilled in the art, without departing from the scope of protection of the invention.

What is claimed is:

1. A method for operating a light source for a camera, wherein the light source comprises at least two individually driveable emitters, the method comprising:

individually illuminating segments of a scene to be recorded by the emitters, wherein an illumination parameter is determined for a segment of the scene and an emitter is individually driven on a basis of the illumination parameter, wherein the illumination parameter is determined by a measurement of a physical variable, wherein the physical variable is an exposure and/or a colour value, wherein the measurement of the physical variable is carried out by the scene being firstly illuminated in a first illumination by the light source in such a way that the emitters are driven identically, wherein the exposure and/or the colour value of at least one segment are/is ascertained by an image sensor, wherein the illumination parameters of the segments are determined on the basis of the ascertained exposure and/or the ascertained colour value, wherein the scene is subsequently illuminated in a second illumination by the light source, wherein in this case the emitters are operated individually differently on the basis of the illumination parameters of the segments, wherein a recording is created by the image sensor during the second illumination, wherein during the first illumination the emitters are operated with a lower light intensity than during the second illumination, wherein a further illumination of the scene by the light source is carried out between the first illumination and the second illumination, wherein the light intensity of the further illumination corresponds to the light intensity of the first illumination, wherein the emitters are operated individually differently on the basis of the illumination parameters of the segments in the case of the further illumination, and wherein, during the further illumination by an image sensor, the exposure and/or the colour value of the segments are/is ascertained and the ascertainment of the exposure and/or the colour value during the further illumination influences a determination of the illumination parameters for the second illumination.

2. The method according to claim 1, wherein the illumination parameter is a light intensity and/or a colour temperature.

3. The method according to claim 1, wherein the individually driveable emitters are constructed from at least two single emitters, wherein the single emitters are in each case individually driveable, and wherein a colour temperature of an emitter as illumination parameter is set by individually driving the single emitters.

4. The method according to claim 1, wherein the physical variable comprises a distance from the camera to an object in a segment of the scene, and wherein the illumination parameter of the emitter is determined on the basis of the distance of the object.

5. The method according to claim 1, wherein a preview image is displayed on a screen of the camera, and wherein a user of the camera manually selects a region of the preview image and defines an illumination parameter for the manually selected region.

6. The method according to claim 4, wherein the distance from the camera to the object is ascertained by a propagation time measurement of a radiation pulse.

7. The method according to claim 4, wherein the distance from the camera to the object is ascertained by a LIDAR.

8. The method according to claim 4, wherein the distance from the camera to the object is ascertained by the scene being illuminated with structured light comprising a predefined pattern, and wherein the predefined pattern is distorted by objects in the segments of the scene, and wherein the distorted light is evaluated.

9. The method according to claim 6, wherein the radiation pulse is emitted by a radiation source, wherein the radiation pulse is reflected from the object partly in a direction of the camera, wherein a spatially resolving radiation detector detects reflected radiation, and wherein the detected radiation comprises different propagation times depending on the segment of the scene and the distance from the object to the camera, and the distance from the object to the camera is determined on the basis of the propagation time.

10. The light source configured to be used according to the method of claim 1.

11. The camera comprising:
the light source according to claim 10;
a control device; and
the image sensor.

12. A method for operating a light source, wherein the light source comprises at least two individually driveable emitters, the method comprising:

illuminating a scene in a first illumination by identically driving the emitters of the light source such that first exposures and/or first colour values of segments are ascertained by an image sensor;

determining first illumination parameters for the segments of the scene, wherein the first illumination parameters are determined based on the first exposures and/or the first colour values;

illuminating the scene in a second subsequent illumination by differently driving the emitters of the light source based on the first illumination parameters of the segments such that second exposures and/or second colour values of the segments are ascertained by the image sensor;

determining second illumination parameters for the segments of the scene, wherein the second illumination parameters are determined based on the second exposures and/or the second colour values;

illuminating the scene in a further subsequent illumination by differently driving the emitters of the light source based on the second illumination parameters of the segments; and recording an image of the scene during the second illumination, wherein during the first illumination the emitters are operated with a lower light intensity than during the further illumination, and wherein a light intensity of the second illumination corresponds to the light intensity of the first illumination.

13. The method according to claim 12, wherein the first illumination parameters or the second illumination parameters are light intensities and/or colour temperatures.

14. The method according to claim 12, wherein an illumination parameter of an emitter is further based on a distance from a camera to an object in a segment of the scene.

15. The method according to claim 14, wherein the distance from the camera to the object is ascertained by a propagation time measurement of a radiation pulse.

16. The method according to claim 14, wherein the distance from the camera to the object is ascertained by a LIDAR.

17. The method according to claim 14, wherein the distance from the camera to the object is ascertained by the scene being illuminated with structured light comprising a predefined pattern, and wherein the predefined pattern is distorted by objects in the segments of the scene, and wherein the distorted light is evaluated.

18. A camera comprising:
the light source according to claim 12;
a control device; and
the image sensor.

* * * * *